US011290231B2

(12) United States Patent
Lerosey et al.

(10) Patent No.: US 11,290,231 B2
(45) Date of Patent: Mar. 29, 2022

(54) COMMUNICATION NETWORK ACCESS POINT, COMMUNICATION NETWORK, AND METHOD OF WIRELESS COMMUNICATION

(71) Applicants: GREENERWAVE, Nice (FR); CENTRE NATIONAL DE LA RECHERCHE SCIENTIFIQUE—CNRS—, Paris (FR); ECOLE SUPÉRIEURE DE PHYSIQUE ET DE CHIMIE INDUSTRIELLES DE LA VILLE DE PARIS, Paris (FR)

(72) Inventors: Geoffroy Lerosey, Paris (FR); Mathias Fink, Meudon (FR); Fabrice Lemoult, Paris (FR); Alexandre Aubry, Ivy sur Seine (FR); Timmy Floume, Paris (FR)

(73) Assignees: GREENERWAVE, Nice (FR); CENTRE NATIONAL DE LA RECHERCHE SCIENTIFIQUE—CNRS, Paris (FR); ECOLE SUPRÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 128 days.

(21) Appl. No.: 16/633,283

(22) PCT Filed: Jul. 12, 2018

(86) PCT No.: PCT/FR2018/051765
§ 371 (c)(1),
(2) Date: Jan. 23, 2020

(87) PCT Pub. No.: WO2019/020894
PCT Pub. Date: Jan. 31, 2019

(65) Prior Publication Data
US 2020/0153578 A1    May 14, 2020

(30) Foreign Application Priority Data

Jul. 28, 2017 (FR) .................................... 17 57269

(51) Int. Cl.
*H04L 5/00* (2006.01)
*H04B 17/309* (2015.01)
(Continued)

(52) U.S. Cl.
CPC ............. *H04L 5/0048* (2013.01); *H01Q 3/44* (2013.01); *H04B 7/0404* (2013.01); *H04B 17/309* (2015.01); *H04W 88/08* (2013.01)

(58) Field of Classification Search
CPC ... H04L 5/0048; H04B 17/309; H04B 7/0404; H01Q 3/44; H04W 88/08; H04W 52/42;
(Continued)

(56) References Cited

U.S. PATENT DOCUMENTS 6,538,621 B1   3/2003   Sievenpiper et al.
7,245,269 B2   7/2007   Sievenpiper et al.
(Continued)

FOREIGN PATENT DOCUMENTS

JP   2007-143044 A      6/2007
WO   2015/039769 A1     3/2015
WO   WO-2015039769 A1 * 3/2015   ............... H01Q 3/46

OTHER PUBLICATIONS

International Search Report, dated Apr. 10, 2018, from corresponding PCT application No. PCT/FR2018/051765.
(Continued)

*Primary Examiner* — Faruk Hamza
*Assistant Examiner* — Aixa A Guadalupe Cruz
(74) *Attorney, Agent, or Firm* — Nixon & Vanderhye

(57) ABSTRACT

A communication network includes an access point, a control unit in communication with the access point, a wave
(Continued)

shaping device in communication with the control unit, and a wireless communication device. The control unit determines parameters of the wave shaping device, the parameters being search parameters if the control unit does not receive a pilot signal, and optimization parameters if the control unit receives a pilot signal.

22 Claims, 4 Drawing Sheets

(51) Int. Cl.
  *H01Q 3/44* (2006.01)
  *H04B 7/0404* (2017.01)
  *H04W 88/08* (2009.01)
(58) Field of Classification Search
  CPC ............ H04W 52/245; H04W 52/247; H04W 52/226; H04W 52/228; H04W 52/143
  See application file for complete search history.

(56) References Cited

U.S. PATENT DOCUMENTS

| | | | |
|---|---|---|---|
| 10,681,568 B1 * | 6/2020 | Hadani | ............... H04L 25/0224 |
| 2004/0263408 A1 | 12/2004 | Sievenpiper et al. | |
| 2016/0233971 A1 | 8/2016 | Fink et al. | |

OTHER PUBLICATIONS

French Search Report, dated Apr. 11, 2018, from corresponding French application No. 1757269.

Subrt et al.; Intelligent walls as autonomous parts of smart indoor environments; IET Communications; Jul. 9, 2012; pp. 1004-1010; vol. 6, No. 8.

* cited by examiner

COMMUNICATION NETWORK ACCESS POINT, COMMUNICATION NETWORK, AND METHOD OF WIRELESS COMMUNICATION

TECHNICAL FIELD

The present invention relates to a communication network access point and to a communication network comprising a wave shaping device and an access point, as well as to a method of wireless communication.

PRIOR ART

Document WO 2015/039769 shows the use of a wave shaping device which uses a pilot signal from a mobile electronic device. The mobile electronic device is for example a mobile phone or a laptop computer. This pilot signal comprises, for example, the reception quality or level of an incident wave at the mobile electronic device.

This shaping device is linked with the mobile electronic device, which is sometimes impractical or highly restrictive, because this mobile electronic device must manage communications with two devices that are independent of one another: the network and the shaping device.

The document "Intelligent walls as autonomous parts of smart indoor environments", L. Subrt, P. Pechac, shows an indoor communication network that controls walls equipped with active frequency-selective surfaces. These active surfaces are controllable between a magnetically transparent state and an insulation state, which makes it possible to control electromagnetic masking between rooms defined by walls so equipped.

This system only provides control between rooms and does not make any improvement to reception for a mobile electronic device. In addition, such a system cannot work in the context of an outdoor communication network.

SUMMARY OF THE INVENTION

The present invention aims to solve the problems explained above, and proposes a communication network access point comprising a transmission module comprising a network antenna for emitting and/or receiving a primary wave, and for receiving a pilot signal from a wireless communication device. This access point is characterized in that it further comprises a control unit which is adapted to send parameters to a wave shaping device, and which determines the parameters on the basis of at least one item of information contained in the pilot signal, the wave shaping device being adapted to reflect and/or transmit the primary wave in a reflected wave as a function of the parameters received from the control unit, the information being a function of the primary wave emitted by the access point and of the wave reflected by the wave shaping device, and in that:

when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters, and as long as the transmission module does not receive a pilot signal from a wireless communication device, the control unit is in a search operating mode wherein the control unit transmits parameters to the wave shaping device, the transmission of each of the parameters being separated in time by a duration enabling reception of a pilot signal by the transmission module.

With these arrangements, the access point manages the wireless communication with the wireless communication device and manages an optimization operating mode of the wave shaping device during which the control unit seeks to optimize the wave shaping device in order to improve communication with the wireless communication device. This collaboration or operation with a wave shaping device improves the range of the access point and/or reduces the power of access point emissions transmitted into the environment.

In addition, the access point also manages (in combination with the above optimization operating mode) a search operating mode of the wave shaping device that enables detection of a wireless communication device.

In various embodiments of the access point according to the invention, one or more of the following arrangements may possibly also be used.

According to one aspect, the network antenna is multiple antennas.

According to one aspect, the access point adjusts, via its network antenna, its emission towards the wireless communication device before allowing the control unit to enter the optimization operating mode which optimizes parameters of the wave shaping device.

According to one aspect, the wave shaping device comprises an antenna and adjusts, via its network antenna, its emission towards said antenna of the wave shaping device before allowing the control unit to enter the optimization operating mode which optimizes parameters of the wave shaping device.

According to one aspect, the access point adjusts, via its network antenna, its emission towards the wireless communication device or towards the wave shaping device after completion of the optimization of the wave shaping device by the control unit.

The invention also relates to a communication network comprising:

an access point comprising a transmission module comprising a network antenna for emitting and/or receiving a primary wave, and for receiving a pilot signal from a wireless communication device, a control unit in communication with the access point via a feedback transmission module of the access point which transmits to it at least one item of information contained in the pilot signal, the control unit determining parameters on the basis of said information; and a wave shaping device in communication with the control unit, the wave shaping device being adapted to reflect and/or transmit the primary wave in a reflected wave as a function of the parameters received from the control unit, and the information being a function of the primary wave emitted by the access point and of the wave reflected by the wave shaping device, and wherein:

when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters, and as long as the transmission module does not receive a pilot signal from the wireless communication device, the control unit is in a search operating mode wherein the control unit transmits parameters to the wave shaping device, the transmission of each of the parameters being separated in time by a duration enabling reception of a pilot signal by the transmission module.

In various embodiments of the communication network, one or more of the following arrangements may also possibly be used.

According to one aspect, the network antenna is multiple antennas.

According to one aspect, the access point adjusts, via its network antenna, its emission towards the wireless communication device before allowing the control unit to enter the optimization operating mode which optimizes parameters of the wave shaping device.

According to one aspect, the wave shaping device comprises an antenna and adjusts, via its network antenna, its emission towards said antenna of the wave shaping device before allowing the control unit to enter the optimization operating mode which optimizes parameters of the wave shaping device.

According to one aspect, the access point adjusts, via its network antenna, its emission towards the wireless communication device or towards the wave shaping device after completion of the optimization of the wave shaping device by the control unit.

According to one aspect, the wave shaping device comprises an antenna, and the wave shaping device uses said antenna to detect the presence of a wireless communication device not detected by the access point, by receiving a pilot signal, and the wave shaping device transmits this detection to the access point in order to allow the control unit to enter the optimization operating mode which optimizes parameters of the wave shaping device.

According to one aspect, the control unit includes a database, and the parameters at least partially come from said database.

According to one aspect, the pilot signal received by the feedback transmission module of the access point comprises geolocation coordinate information for the wireless communication device, and the control unit determines the parameters of the optimization operating mode on the basis of said geolocation coordinate of the wireless communication device.

According to one aspect, the parameters of the search operating mode are determined randomly.

According to one aspect, the distance between the access point and the wave shaping device is at least one tenth of the range of the access point.

According to one aspect, the control unit transmits the parameters to the wave shaping device via a wireless link in a management channel.

According to one aspect, the access point is a first access point emitting a first primary wave, and the communication network further comprises a second access point, the second access point emitting a second primary wave, and the wave shaping device being adapted to reflect and/or reflect the first primary wave as a first reflected wave and the second primary wave as a second reflected wave.

According to one aspect, the wave shaping device is a first wave shaping device, and the communication network further comprises a second wave shaping device, the control unit transmitting parameters to the second wave shaping device independently of the parameters determined for the first wave shaping device.

According to one aspect, the wireless communication device is a first wireless communication device, and the pilot signal is a first pilot signal emitted by the first wireless communication device; and the communication network further comprises a second wireless communication device which emits a second pilot signal; and the access point transmits at least some information from the first pilot signal and second pilot signal to the control unit so that the control unit can determine the parameters on the basis of the first pilot signal and second pilot signal.

According to one aspect, the wave shaping device comprises two portions, each of the two portions being adapted to modify a primary wave in a different bandwidth than that of the other portion and each of the two portions being configurable independently of one another.

According to one aspect, the primary wave corresponds to a wave of a communication channel of a network of a type selected from a list comprising a wireless telephony network, a wireless computer network, and a network of connected objects.

The invention also relates to a method of wireless communication method implemented in a communication network comprising:

an access point comprising a transmission module comprising a network antenna for emitting and/or receiving a primary wave, a control unit in communication with the access point via a feedback transmission module of the access point, and a wave shaping device in communication with the control unit, said method being characterized in that:

the wireless communication device emits a pilot signal in response to a received primary wave, the access point transmits, to the control unit and via the feedback transmission module, at least one item of information contained in the pilot signal, the control unit determines parameters on the basis of said information, and transmits the parameters to the wave shaping device, the wave shaping device reflects and/or transmits the primary wave in a reflected wave as a function of the parameters received from the control unit, the information being a function of the primary wave emitted by the access point and of the wave reflected by the wave shaping device, and when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters, and as long as the transmission module does not receive a pilot signal from the wireless communication device, the control unit is in a search operating mode wherein the control unit transmits parameters to the wave shaping device, the transmission of each of the parameters being separated in time by a duration enabling reception of a pilot signal by the transmission module.

BRIEF DESCRIPTION OF DRAWINGS

Other features and advantages will become apparent from the following description of several embodiments, given as non-limiting examples, with reference to the accompanying drawings.

In the drawings.

In the different figures, the same numerical references designate identical or similar elements.

DETAILED DESCRIPTION

The invention relates to a communication network based on waves which may be electromagnetic, acoustic, or vibratory in nature. For simplicity, the description below will refer to an electromagnetic wave, in particular for use in mobile telephony. However, the described communication network applies to any wave frequency domain.

Figure 1:
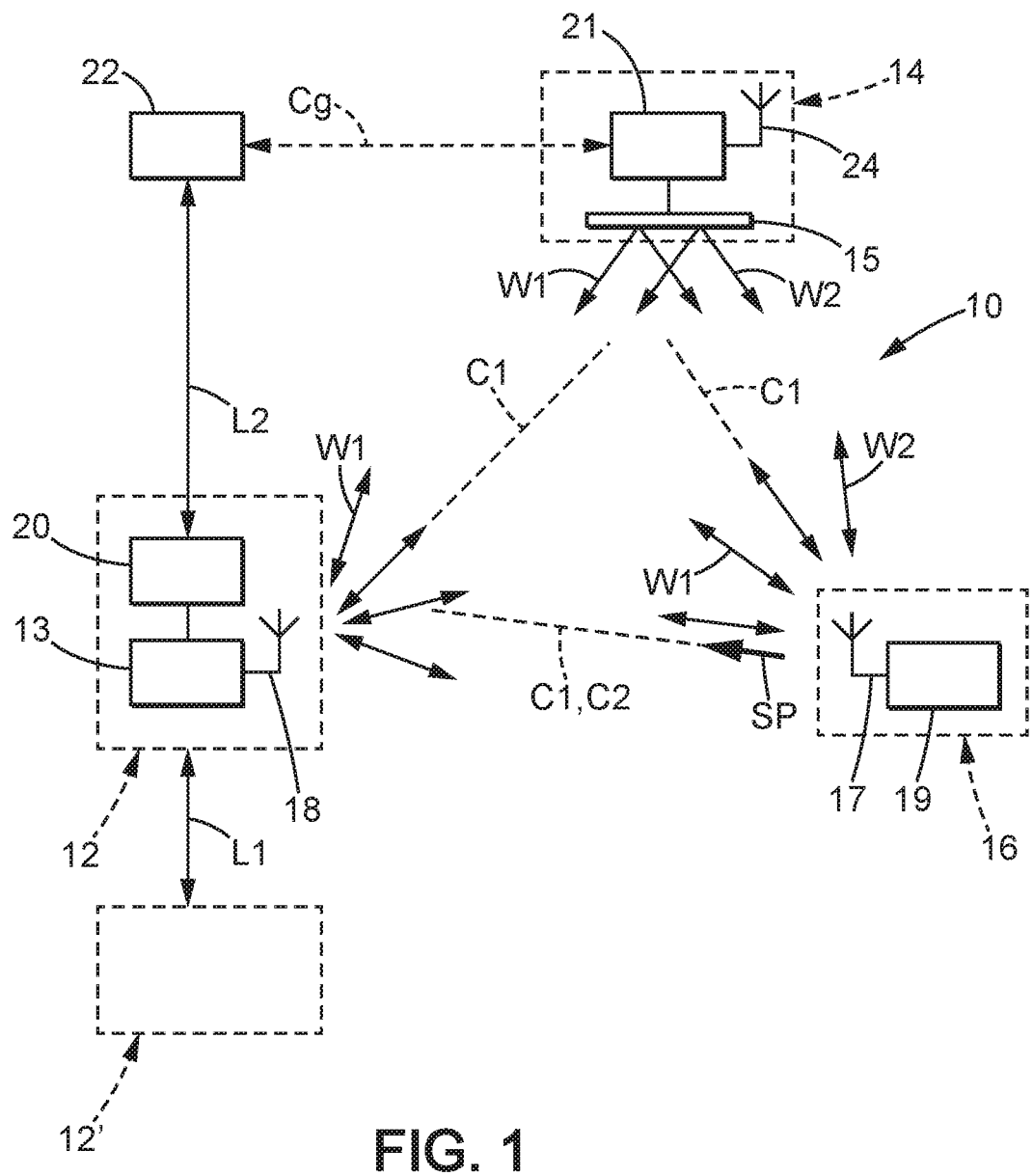
FIG. 1 is a schematic representation of a first embodiment of a wireless communication network.

Referring to FIG. 1, a communication network 10 according to a first embodiment, provided as an example, includes an access point 12, a control unit 22, a wave shaping device 14, and a wireless communication device 16, typically a mobile phone.

The access point 12 is advantageously connected to a global communication network comprising network links L1 which interconnect other access points 12' of said global communication network, which makes it possible to connect very distant users. The access point 12 therefore constitutes, for the communication network 10, an entry gate or an exit gate (gateway) to the global communication network. The communication network is able to carry channel-type information (telephony) and/or data-type information (internet). In applications to channel communication, i.e. telephony, the access point 12 corresponds for example to a mobile telephone network base station or a femtocell or a picocell. In the case of applications to data communication, the access point 12 corresponds for example to an Internet modem often called an Internet box adapted to serve as a gateway between the Internet global computer network and a local area network for example inside a building via a wireless link such as WiFi. In a variant, the access point is a modem integrating other functions of the local area network, this device thus then able to be a router (network address server). In a variant, the access point is an auxiliary device of a local area network, for example a repeater that extends the range of a local area network.

The access point 12 comprises:

a transmission module 13 adapted to emit and/or receive a wave, usually called primary wave W1, and which allows emitting and receiving mobile telephony communications in a first communication channel C1, and a feedback transmission module 20 adapted to receive a pilot signal SP coming from a wireless communication device 16, for example such as a mobile phone.

The transmission module 13 comprises a network antenna 18 emitting and/or receiving the primary wave W1. The network antenna 18 may be a single antenna or multiple antennas for establishing a MIMO-type link (for "Multiple Inputs Multiple Outputs"). The network antenna 18 may be an omnidirectional antenna or directive.

The feedback transmission module 20 receives the pilot signal SP coming from the wireless communication device 16, by any means and possibly by the transmission module 13, and transfers part of it (certain information) or all of it to a control unit 22, directly or indirectly. Optionally, the feedback transmission module 20 preprocesses the pilot signal SP to extract information from it and/or to transform said information by calculations and/or transformations and/or coding. For example, the feedback transmission module 20 establishes or evaluates the reception estimate for the first transmission channel C1, i.e. the estimate of the gain and phase change of this first communication channel C1 between the wireless communication device 16 and the access point 12 (uplink). The access point 12 itself emits an emission pilot signal that the wireless communication device 16 uses to reciprocally establish or evaluate an emission estimate for the first transmission channel C1 in the reverse direction, i.e. between the access point 12 and the wireless communication device 16 (downlink). The wireless communication device 16 then transmits the emission estimate to the access point 12, and conversely the access point 12 transmits the reception estimate to the wireless communication device 16. This exchange of reception and emission estimates for the first communication channel C1 makes it possible to improve transmissions in the two communication directions.

The control unit 22 is connected to the feedback transmission module 20 of the access point 12 in order to receive the pilot signal SP and/or information extracted from said pilot signal and/or information evaluated/estimated from said pilot signal. The control unit 22 is linked with the wave shaping device 14 in order to configure it. Thus, in general in the above variants, the control unit 22 processes the pilot signal SP to generate configuration parameters for the shaping device 14, as will be explained below.

According to a first variant, the control unit 22 is an integral part of the access point 12.

According to a second variant, the control unit 22 is an integral part of the wave shaping device 14 described below.

The wave shaping device 14 comprises an adaptable (electromagnetic) surface 15 which reflects and/or transmits an incident wave, such as for example the primary wave W1, in a reflected wave W2 modified during its reflection and/or transmission by the adaptable surface 15 of the wave shaping device 14.

The wave shaping device 14 may also comprise a controller 21 for its operation. This controller 21 is connected to the electromagnetic surface in order to control said adaptable surface 15, in particular in order to vary the electromagnetic impedance, thus modifying the manner in which the primary wave W1 is reflected and/or transmitted, according to the configuration parameters determined by the control unit 22.

Thus, the wave shaping device 14 is a passive device that modifies the reflection/transmission of an incident wave. Thus, it modifies the distribution of the waves around it, by modifying conditions on its adaptable surface 15. This device does not add electromagnetic energy to the environment, but modifies its spatial distribution.

The wave shaping device 14 is not an active device, such as an antenna that emits and radiates an electromagnetic wave and thus adds an emission of electromagnetic energy into the environment.

U.S. Pat. No. 6,538,621 shows a type of electromagnetic surface of adaptable or modifiable impedance that can be used in the wave shaping device 14. This electromagnetic surface comprises a plurality of resonant elements, each resonant element being tunable. The electromagnetic surface of this patent comprises array elements located at a distance from a ground plane, adjacent array elements being connected to each other by an arrangement of variable capacitors, each variable capacitor being controllable by a command potential. The impedance of the electromagnetic surface is modified accordingly, for example to focus the modified wave or to give a direction to the modified wave.

Another example, described in international application WO 2015/039769, shows a plurality of tunable elements comprising two separate resonator elements. The first resonator resonates, for example, at a first frequency and the second resonator resonates at a second frequency different from the first frequency. The frequencies are adjustable. The set of tunable elements may comprise different states. The tunable states define a specific impedance for the electromagnetic surface. The impedance of the electromagnetic surface modifies the reflection of the primary wave W1 on the wave shaping device 14. Controlling the states of these tunable elements thus controls the wave shaping device 14.

Other embodiments of the wave shaping device 14 are possible.

The wave shaping device 14 generates a particular reflection of the primary wave W1 emitted by the network antenna 18 of the access point 12, on the basis of parameters determined from information contained in the pilot signal SP which are transmitted to it from the wireless communication device 16 and via the access point 12. The parameters are, for example, the settings for the tunable elements of the adaptable surface 15 of the shaping device 14 and which enable defining the electromagnetic impedance of this adaptable surface 15.

The access point 12 can relay the entire pilot signal SP to the control unit 22 or just portions of the pilot signal SP which concern the communication with the wireless communication device 16. The extracted information contains, for example:

an estimate of the level (amplitude, power, intensity, energy) of reception of the primary wave W1 by the wireless communication device 16 through the first communication channel C1 between the access point 12 and the wireless communication device 16, or an estimate of the quality (level of interference, bandwidth, rate, noise level) of reception of the primary wave W1 by the wireless communication device 16 through the first communication channel C1 between the access point 12 and the wireless communication device 16, or an estimate of the channel in transmission and/or reception (or "Channel State Information" CSI), e.g. an estimate of the amplitude and phase between each antenna of the wireless communication device and/or each antenna of the access point, this estimate possibly made for a plurality of frequencies of the bandwidth of the first communication channel C1, which makes it possible to form a matrix of the channel.

The extracted information transmitted to the control unit 22 may also contain data on neighboring networks using the first communication channel C1 or other unused communication channels between the wireless communication device 16 and the access point 12, either determined at the wireless communication device 16 or determined at the access point 12 itself. These data on neighboring networks or other wireless communications are, for example, network identification names using these other channels (such as "Service Set Identifier" SSID names for a WiFi network), possibly with the levels received (amplitude, power) for each of these networks of the other channels (different from the first communication channel C1).

The information contained in the pilot signal SP may contain other estimates.

The wave shaping device 14 can thus be used to improve the reception of the wireless communication device 16 in an area encompassing the wireless communication device 16 and in the vicinity of the wave shaping device 14, by means of controlled reflection of the primary wave W1. The wave shaping device 14 is for example useful in an environment comprising complex reflections of electromagnetic waves which interfere and in particular which cause local destructive combinations of the primary wave, which disrupts (reduces the quality) and/or reduces the amplitude of the reception of the wireless communication device 16.

A control unit 22 controls the wave shaping device 14 to configure it so as to generate a desired or at least optimized reflected wave W2, as a function of the pilot signal SP. The control unit 22 determines parameters from information contained in and/or evaluated from the pilot signal SP and sends these parameters via a management channel Cg to the wave shaping device 14 in order to modify the tunable elements of the adaptable surface 15, which consequently modifies the reflected wave W2. The access point 12 can therefore control the wave shaping device 14, via the control unit 22, to modify the reception of the primary wave W1 by the wireless communication device 16. For example, it will improve this reception due to the contribution of the reflected wave W2.

The control unit 22 is shown in FIG. 1 as being physically separate from the access point 12 and shaping device 14. In such case, the control unit is for example connected to the access point 12 by a control unit link L2 (wired or wireless). This control unit link L2 is part of a local area network (as shown) or is a portion of the network link L1 of the global communication network. However, according to some variants adaptable to all embodiments, the control unit 22 may be contained either in the access point 12 or in the shaping device 14, for example in the form of "simple" software integrated into a processing unit of one or the other.

The control unit 22 is in communication with the access point 12 in order to receive information from the pilot signal SP for the purposes of controlling the wave shaping device 14 based on this information. According to one variant, the control unit 22 receives the pilot signal SP directly, without passing through the access point 12, and it itself extracts the information necessary for processing, and in particular for determining the adjustment parameters for the adaptable surface 15. According to another variant cited above, the control unit 22 is contained in the wave shaping device 14. In this case, the control unit may possibly receive the pilot signal SP directly, without passing through the access point 12, and extracts the information for processing, and in particular for determining the parameters.

The management channel Cg may use a wired or wireless link. The wired link is for example an Ethernet, USB, or fiber optic type of link. The wireless link is for example a mobile telephony link, for example fourth generation (4G) or other, or a wireless local area network link, for example WiFi, or a Bluetooth link, or an Internet of Things iOT type of link.

The control unit 22 may also communicate reciprocally with the access point 12 in a manner that may or may not also be wireless.

The wireless communication device 16 is any mobile or fixed device that communicates wirelessly. The wireless communication device 16 is for example a mobile phone, a laptop computer equipped with:

a mobile telephony module that implements any telecommunication protocol of the first generation 1G, second generation 2G, third generation 3G, fourth generation 4G or LTE, fifth generation 5G, and/or a wireless local area network module, for example WiFi or Bluetooth, or iOT.

The wireless communication device 16 is for example any peripheral device equipped with a mobile telephony module or with a wireless local area network module, as mentioned above.

The wireless communication device 16 may be powered by an electrical outlet or powered via an internal battery. It is possible for the wireless communication device 16 not to be mobile.

The wireless communication device 16 emits the pilot signal SP at regular intervals in order to communicate, to devices within range:

its presence in the environment close to said devices (one or more access points, various equipment, etc.), and/or several items of information concerning for example the reception of the primary wave W1 transmitted in the first communication channel C1.

The pilot signal SP contains, for example, information on the amplitude and/or quality of the primary wave W1 received by the wireless communication device 16 and/or the estimate for the communication channel C1, and optionally information about the presence of other devices in the vicinity.

The wireless communication device 16 comprises an antenna 17 for receiving and/or emitting a primary wave W1 (directly or indirectly by reflection on environmental elements, e.g. reflected wave W2), and a processing unit 19 connected to the antenna 17 for processing signals from and to the antenna 17 and for forming the pilot signal SP.

According to a first variant, the wireless communication device 16 transmits and/or evaluates the pilot signal via a primary wave W1 emitted by the antenna 17 in the first communication channel C1.

According to a second variant, the wireless communication device 16 transmits and/or evaluates the pilot signal SP via a secondary wave W1' emitted by the antenna 17 or by an auxiliary antenna in a second communication channel C2. The device that is to receive this pilot signal SP reciprocally possesses an antenna adapted to this second communication channel C2. The second communication channel is a link of the same type as that of the first communication channel, or of a different type. For example, the first communication channel C1 is a WiFi link and the second communication channel C2 is a Bluetooth link.

The communication network 10 operates for example in the following manner.

A location (for example a room, or a dwelling, building, or even a means of transportation (for example a car, boat, bus, airplane) is equipped with the wave shaping device 14 controlled by the access point 12 via the control unit 22.

The network antenna 18 of the access point 12 has a range which depends on the technology used (type of wireless link). This range distance or range is a distance usually defined in an unobstructed area (empty environment, no object that is reflective within the frequency band of the primary wave). This range distance is for example the distance starting at which the primary wave has an amplitude reduced to 90% compared to its emission at the network antenna 18. In the actual environment, the distance at which the primary wave has such attenuation is less than the range distance, because of interfering elements of the environment (buildings, vehicles, etc.).

The wave shaping device 14 is placed at an installation distance from the access point 12 (its network antenna 18) that is less than said range distance so that it receives a primary wave W1 and is able to modify it into a reflected wave W2 of sufficient amplitude to modify the electromagnetic environment. The installation distance may be greater than a minimum distance: the shaping device 14 is placed at a distance from the access point 12 that allows influencing the reception of a mobile wireless communication device 16, which itself is usually at a variable distance from the access point 12.

However, the short-range reception (level and quality) of a wireless communication device is often good or even very good, and degrades as the distance increases due to the attenuation with distance and multiple reflections from the environment and/or the destructive interference of these reflections. Therefore, it may be advantageous to place the wave shaping device 14 at an installation distance that is close to the range distance, or comprised between half of this range distance and the range distance. However, this depends greatly on the actual environment, and measurements and/or optimization will find the compromise in the location of said wave shaping device 14 in said environment.

For example, the installation distance between the access point 12 and the wave shaping device 14 is at least one-tenth of the range distance of the primary wave W1 of the access point 12. Optionally, this installation distance is greater than two tenths or even half of the range distance, depending on each configuration of the environment. The shaping device 14 is placed at an installation distance from the access point 12 and especially at a position in the environment which can improve the coverage area (accessible surface area) of the wireless communication network by a wireless communication device 16, for example in order to cover underserved areas.

The wireless communication device 16 emits a pilot signal SP in order to be detected by the devices present in its environment, and in particular by the access point 12.

In a first example, the access point 12 does not receive the pilot signal SP coming from a wireless communication device 16. This could, for example, be the case:

1) if the wireless communication device 16 is out of range of the access point 12, in other words the primary wave W1 reaches the communication device 16 with an amplitude or quality that is too low, or 2) if the access point 12 is out of range of the wireless communication device 16, in other words the pilot signal SP does not reach the access point 12, for example if it is too attenuated by distance or by the presence of other waves in the environment of the wireless communication device 16 to the point that the pilot signal is imperceptible to the access point 12.

As long as the access point 12 does not receive the pilot signal SP, it is not aware of the presence of the wireless communication device 16. In such case, and in order to detect the wireless communication device 16, the control unit 22 enters a first mode, search operating mode, and periodically transmits parameters called first parameters to the wave shaping device 14. These first parameters change a configuration of the tunable elements, and thus periodically modify the impedance of the adaptable surface 15, which modifies the reflected wave W2 which is reflected by said adaptable surface 15. A different reflected wave W2 is thus created for each configuration of the tunable elements, in other words for each first parameter sent to the wave shaping device 14. The reflected wave W2 may be such that it creates, for such a configuration of the wave shaping device 14, by combination with the primary wave W1 emitted by the access point 12 and the other waves and/or reflected waves of other devices or of the environment, a constructive (additive) interference which allows reception of the primary wave W1 received by the wireless communication device 16, which previously was not received or was less well received by the wireless communication device 16.

Thus, as long as the access point 12 does not receive the pilot signal SP, the control unit 22 sends the first parameters at time intervals in order to observe, during said time interval, a possible reception of the pilot signal SP by the access point 12.

The transmission of the parameters may be periodic (in other words at regular time intervals) or non-periodic (in other words at irregular time intervals). The first parameters, for example, may be chosen randomly or may be part of a Hadamard matrix. The parameters may also be taken from a database of the control unit 22. This database may be gradually filled on the basis of previous receptions of pilot signals as the wireless communication device 16 is used or may be pre-filled with predetermined values at the time the control unit 22 is programmed or by a learning phase on site, i.e. in the environment. The access point 12 emits new first parameters and iteratively observes the detection of the pilot signal SP until the pilot signal SP is received.

Once the access point 12 receives the pilot signal SP from the wireless communication device 16, the control unit 22 enters a second mode, optimization operating mode, and determines and sends parameters which are now called second parameters to the layout device 14.

According to a first variant, the second parameters are determined for the purpose of causing a value to evolve on the basis of information contained in the pilot signal SP, for example in order to improve communication between the access point 12 and the wireless communication device 16, and vice versa. For example, the value is simply part of the information contained in the pilot signal SP, such as the level (amplitude or power or intensity) or the quality (level of interference, bandwidth, rate) or the estimate of the communication channel C1, or a simple or weighted combination, or any cost function of this information. The value may also be determined with the combination of data on neighboring networks in order to avoid interference between multiple networks. Alternatively, the control unit 22 may decide to change the communication channel, and may inform the access point 12 and/or the wave shaping device 14 and/or the wireless communication device 16 (directly or indirectly by one of the foregoing elements).

After each time interval, the control unit 22 executes an optimization algorithm which uses said value explained above and the previous values (from previous time periods) and the previous second parameters (from previous periods) to calculate the new second parameters to be applied by the shaping device 14. Period after period, the algorithm optimizes said value, minimizing or maximizing it according to the type of function or cost function stored beforehand in the algorithm of the control unit 22.

The second parameters are at least partly different from the first parameters. The second parameters serve a different purpose than the first parameters. While the first parameters are used for detecting the wireless communication device 16, the second parameters are used for optimizing a value that is a function of the pilot signal SP, in other words a value that is a function of information contained in the pilot signal SP.

The value that is a function of the pilot signal SP may be minimized, maximized, and/or modulated according to other values. For example, the value is a power received by the wireless communication device 16. This optimization of the value (whatever its type) can also result in an increase or decrease in the power of the emission of the access point 12. The algorithm of the control unit may also take into account this power of emission and optimize the second parameters to maximize the reception of the communication at the wireless communication device 16, while simultaneously reducing the power of emission of the access point 12. In particular, due to the wave shaping device which is a passive device (without adding electromagnetic energy), it is thus possible both to improve reception and reduce emission of the network antenna 18.

In another example, in which there are several wireless communication devices 16, 16' as described in more detail below, the power of emission of the access point 12 towards the first wireless communication device 16 may be decreased or minimized to allow better communication with a second wireless communication device 16' present in the environment, which would require for example more bandwidth. It is thus possible to mitigate or reduce interference between the communications of the wireless communication devices 16, 16' and optimize the spectral resources (available bandwidth) in order to distribute them among the wireless communication devices, i.e. distribute them according to the individual needs of each one. The algorithm of the control unit 22 can modify its cost function for calculating the second parameters based on data concerning the access point 12 itself, or a plurality of information originating from pilot signals SP from several wireless communication devices.

As explained above, the algorithm determines the second parameters based on previous receptions of the pilot signal SP and prior second parameters. The control unit 22 sends the second parameters at time intervals in order to observe a possible reception of the pilot signal SP during the next time interval. Thus, for example, if the desire is to maximize the level of reception by the wireless communication device 16, the control unit 22 conducts tests of new second parameters in real time which allow iteratively increasing said reception level of the wireless communication device 16.

According to a second variant, the second parameters are not determined by the calculations of an iterative optimization algorithm, but may also be chosen from second parameters stored in the database. These second parameters may correspond to previous receptions, for example corresponding to already optimal values or having been optimized with the optimization algorithm. In addition, if for example geolocation of the wireless communication device 16 is possible, the control unit 22 could also associate second parameters collected in the past which optimized reception of the communication for the same spatial location of the wireless communication device 16.

According to a third variant, the second parameters may also be determined by estimates of the first communication channel C1. In the case of a multitude of antenna elements with emission by the network antenna 18 and/or with reception by the antenna 17 of the wireless communication device 16, the estimates of the first communication channel C1 may be rows in a channel transfer matrix. In such case, the algorithm of the control unit will advantageously perform optimization matrix calculations, as is known, thus using the inversion of this matrix or the conjugation or the decomposition into singular values.

According to a fourth variant, the optimization algorithm of the control unit 22 will not perform an optimization calculation after each reception of a pilot signal SP, but will carry out the second parameter optimization calculation after a predetermined number of receptions of pilot signals SP, which makes it possible to obtain a convergence that is less sensitive to unforeseen circumstances and is more stable. The second parameters are updated less quickly but can ultimately converge more quickly to the optimal configuration.

According to a fifth variant, the time interval between each calculation of second parameters is not constant, i.e. the time periods are not regularly periodic.

The communication network 10 could have other variants, used in isolation or in combination with one another, some of which are described below.

For example, the wave shaping device 14 also comprises an antenna 24. If the network antenna 18 of the access point 12 is MIMO-type with multiple antennas, the access point 12 can be programmed to adjust its emission and/or reception at the antenna 24 of the wave shaping device 14 in order to increase first and foremost the level of the primary wave W1 received on the adaptable surface 15, and therefore to increase the level of the reflected wave W2.

This adjustment can be achieved by focusing or a beamforming technique or a channel equalization technique or a stored setting or any known technique.

In this manner, the shaping device 14 has more effect on the electromagnetic field near the wireless communication device 16, i.e. on the reflected wave W2 received by the wireless communication device 16.

The beamforming of the primary wave W1 is obtained by adjusting the delays and gain of each signal of the antenna elements of the network antenna 18 of the access point 12. This adjustment is a first optimization performed by the access point 12 which seeks to maximize a level of reception of the primary wave W1 at the antenna 24. For this purpose, the shaping device 14 returns this level to the access point 12 by any means, and for example by the management channel Cg and/or the network link L1 and/or the control unit link L2.

Once the beamforming is correctly adjusted on the antenna 24 of the shaping device 14, the access point 12 sends a command to the control unit 22 for it to take over. Thus:

if no wireless communication device 16 is detected, the control unit 22 is in the first search mode, where it uses first adjustment parameters for the adaptable surface 15 to attempt to detect a wireless communication device, if a wireless communication device 16 is detected, the control unit 22 is in the second optimization operating mode, where it uses second adjustment parameters for the adaptable surface 15 to improve the reception of the primary wave W1 by a previously detected wireless communication device 16.

Thus, the control unit 22 performs a second optimization (adaptation of the shaping device) after the first optimization (adjustment at the shaping device, for example by beamforming) performed by the access point 12.

As soon as the second adjustment parameters for the adaptable surface 15 have been obtained in a stable manner, in other words the second optimization has reached a termination criterion, the control unit 22 can send end-of-optimization information to the access point 12, and the access point may possibly return to the first optimization mode of adjusting its emission and/or reception at the antenna 24 of the shaping device 14. Thus, the ensemble of access point 12 and control unit 22 can periodically alternate between a first adjustment optimization of the access point at the shaping device, and a second optimization of adjustment parameters of the shaping device. The period and the number of iterations may be defined by the access point.

Thus, giving priority to adjustment of the access point at the antenna 24 of the shaping device 14 (for example by beamforming), before the optimization of the adaptable surface 15, is beneficial to the control unit 22 because it improves:

detection of the wireless communication device 16 during the first operating mode of searching for a wireless communication device 16, and optimization of the adaptable surface during the second operating mode of optimization.

The first and second parameters are thus determined more quickly. During such operation, the adaptable surface 15 of the wave shaping device 14 functions as if it were a network antenna that is remote or moved from the position of the access point 12 towards the position of the shaping device 14, since the adaptable surface 15 reflects and/or transmits the incident primary wave W1 with an intensity improved by the adjustment of the emission and/or reception (for example by beamforming) of the access point 12 at the antenna 24 of the shaping device 14.

With the above arrangements, the access point 12 and the shaping device 14 are coupled to improve communication with the wireless communication device.

In another example, the network antenna 18 of the access point is also MIMO-type with multiple antennas, and once the pilot signal SP has been received and/or evaluated by the access point 12, the access point 12 can adjust its emission and/or reception directly at the wireless communication device 16, primarily in order to increase and/or improve reception at the wireless communication device 16.

This adjustment can be made in transmission and/or reception, for example by a focusing technique or a beamforming technique or a channel equalization technique or a stored setting or any known technique.

Once this focusing is correctly set at the antenna 17 of the wireless communication device 16 (for example by beamforming), the access point 12 sends the control unit 22 a command authorizing it to enter the second operating mode of the (second) optimization where second parameters are determined as described above. The adaptable surface 15 is then configured to further improve the reception and/or emission of the communication with the wireless communication device 16.

As soon as the second adjustment parameters for the adaptable surface 15 have been obtained in a stable manner, in other words the second optimization has reached a termination criterion, the control unit 22 can send end-of-optimization information to the access point 12, and the access point may possibly return to the first optimization mode of focusing on the antenna 17 of the wireless communication device 16. Thus, the ensemble of access point 12 and control unit 22 can periodically alternate between a first focusing optimization of the access point at the wireless communication device, and a second optimization of adjustment parameters of the shaping device. The period and the number of iterations may be defined by the access point.

Thus, giving priority to focusing by beamforming at the antenna 17 of the wireless communication device 16 makes it possible first and foremost to improve reception by the wireless communication device 16, independently of the wave shaping device 14. This operation does not improve detection of the wireless communication device 16, but makes it possible to improve its communications more quickly (reception and/or emission).

With the above arrangements, the access point 12 and the shaping device 14 are coupled to improve communication with the wireless communication device.

In another example, the wave shaping device 14 comprises an antenna 24 and uses it to detect the possible presence of a wireless communication system 16 which would be within range of this antenna 24 and which would not be within range of the network antenna 18 of the access point 12 which is for example at a greater distance. This detection within the range of the wave shaping device 14 makes it possible to determine the presence of one or more wireless communication devices 16 in the environment even before reception of the pilot signal SP by the access point 12, and therefore allows positioning the control unit 22 in its search state with first parameters, and possibly with beamforming of the network antenna 18 at the shaping device 14.

In yet another example, the first communication channel C1 between the access point 12 and the wireless communication device 16 is symmetrical, in other words the communication in a first direction (cited above) and the direction opposite the first direction (i.e. between the wireless communication device 16 and the access point 12) occurs on the same bandwidth of said first communication channel. As a variant, the first communication channel is asymmetrical (i.e. in two bandwidths) for example to increase the rate in either the first direction or the opposite direction.

In yet another example, the management channel Cg between the access point 12 and the wave shaping device 14 (and possibly also the first communication channel C1 between the access point and the wireless communication device 16) is asymmetrical, in other words it communicates over two or more bandwidths, thus creating two (or more) communication sub-channels Cg, Cg' or C1, C1'. For example: a 2.43 GHz bandwidth and a 2.47 GHz bandwidth. The wave shaping device 14 could be controlled by the control unit 22 to optimize the signal on each bandwidth independently. For example, the control unit 22 could control one portion of the tunable elements of the adaptable surface 15 to optimize on a first bandwidth and a second portion of the tunable elements to optimize on a first bandwidth. In another example, two juxtaposed wave shaping devices 14 are controlled by the control unit 22, each being optimized as a function of the first associated communication channel C1, C1'. This spatial division of the wave shaping device 14 makes it possible to process these two first communication channels at the same time. Each bandwidth can be associated with different wireless communication devices 16 (for example two mobile phones present in the environment) or two different operating modes for the same wireless communication device 16: for example a communication uplink and a communication downlink.

Figure 2:
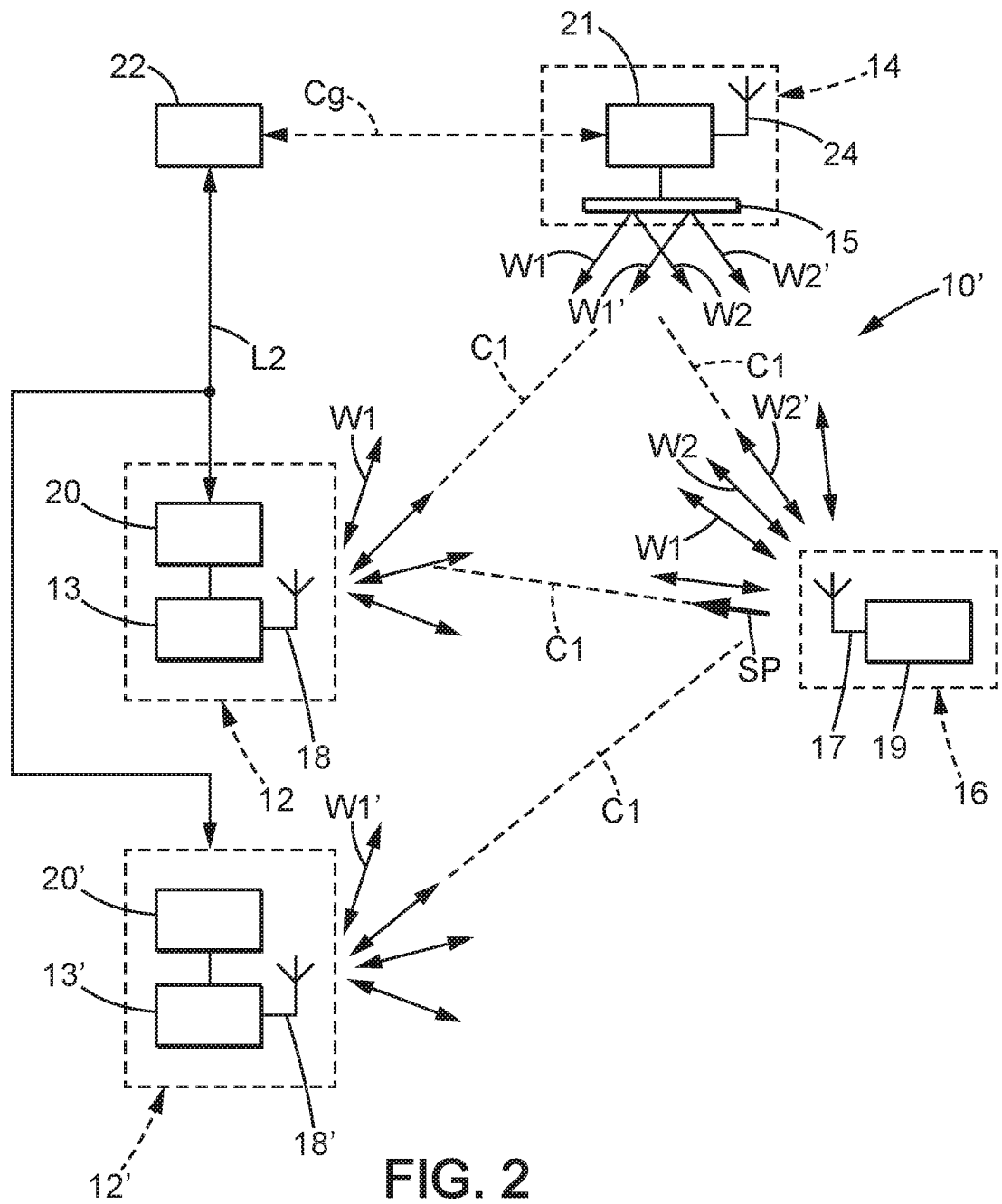
FIG. 2 is a schematic representation of a second embodiment of a wireless communication network.

Referring now to FIG. 2, a communication network 10' according to a second embodiment will be described.

The communication network 10' of the second embodiment is similar to the communication network 10 of the first embodiment and its variants can also be applied with the same respective advantages, except that it comprises a second access point 12'. Elements common to communication network 10' and communication network 10 will not be described again.

The second access point 12' is similar to access point 12 (hereinafter referred to as the first access point 12 for the sake of clarity) and comprises a transmission module 13' for the primary wave W1' in the first communication channel C1, and a feedback transmission module 20' which retransmits a pilot signal SP to the control unit 22. Transmission module 13' comprises a network antenna 18' emitting primary wave W1'. Network antenna 18' may be a single antenna or MIMO-type multiple antennas (for "Multiple Inputs Multiple Outputs"). Feedback transmission module 20' receives the pilot signal SP originating from the wireless communication device 16, and communicates it to the wave shaping device 14 (directly or indirectly). It is possible that the second access point 12' is not in direct communication with the wave shaping device 14. The second access point 12' may possibly be networked to the first access point 12 for example via the network link L1 of the global communication network or via a local area network link. In the case where the communication network (local or global) comprises several access points 12, for example to cover a building, at least one among the first and second access points 12, 12' is connected to the control unit 22 in order to relay the pilot signal SP or information contained in the pilot signal SP.

The wave shaping device 14 reflects primary wave W1' originating from the second access point 12' and reflects it as a reflected wave W2'. This reflected wave W2' combines with the other waves W1, W2, and W1' on the wireless communication device 16. The control unit 22 takes into account information from the pilot signal SP originating from the wireless communication device 16 and concerning the communication with the first access point 12 and second access point 12'. For example, the control unit 22 may iteratively determine configuration parameters of the shaping device 14 by evaluating an optimization value that utilizes this information from both access points. For example, if the communication with the first access point 12 is better than that with the second access point 12', for any reason such as a shorter distance or less interference in the transmission, the optimization algorithm of the control unit 22 may give preference to communication from the wireless communication device via the first access point 12 rather than via the second access point 12', by increasing the level of reflected wave W2 relative to the level of reflected wave W2'.

Thus, the shaping device 14 shared with the two access points 12, 12' can facilitate the communication of a wireless communication device 16 with the first access point 12 while it facilitates the communication of another wireless communication device 16' with the second access point 12'. The wave shaping device 14 thus helps to associate the various wireless communication devices 16, 16' with an access point, which corresponds to the cellularization of the communication network between the various access points 12, 12'.

The communication network 10' of this second embodiment operates similarly to the communication network 10 of the first embodiment, except that the control unit 22 takes into account the presence of the two access points (the first access point 12 and the second access point 12') and their intrinsic performance or their performance for the communication with the wireless communication device 16 in order to determine the parameters of the wave shaping device 14.

Although the case of only two access points 12, 12' was discussed above, it is possible for the communication network 10' to have more than two access points for attempting to communicate with the wireless communication device 16.

Figure 3:
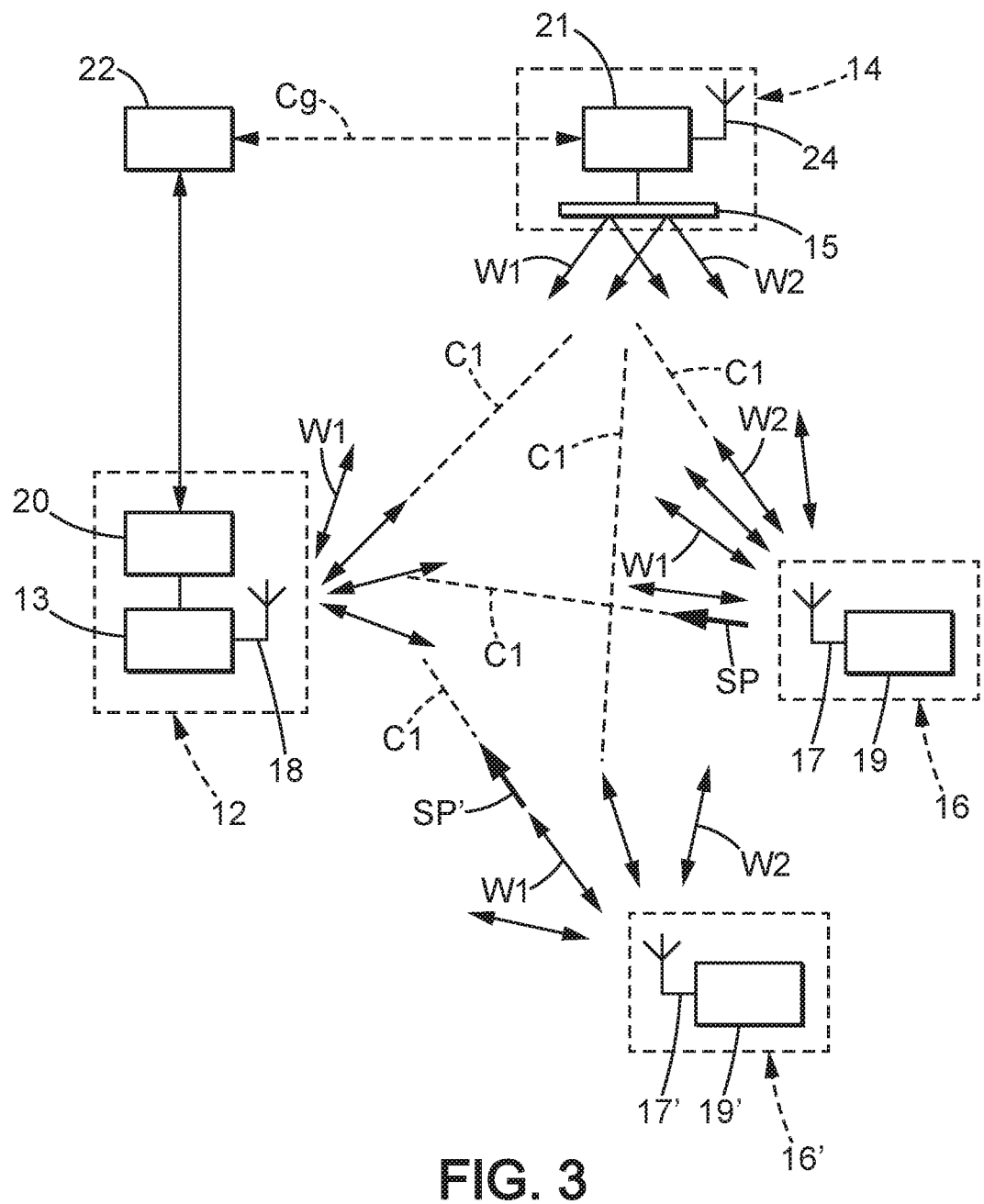
FIG. 3 is a schematic representation of a third embodiment of a wireless communication network.

Referring now to FIG. 3, a communication network 10" according to a third embodiment will now be described.

The communication network 10″ of the third embodiment is similar to the communication network 10 of the first embodiment, and its variants can also be applied with the same respective advantages. Communication network 10″ essentially differs in that it comprises a second wireless communication device 16′, similar to the wireless communication device 16 of the previous embodiments (hereinafter referred to as the first wireless communication device 16 for further clarity). Elements common to the communication network 10 of the first embodiment and/or the communication network 10′ of the second embodiment will not be described again.

Communication network 10′ functions similarly to the communication network 10 of the first embodiment, except that the control unit 22 takes into account the second wireless communication device 16′ in determining the parameters of the wave shaping device 14 in order to optimize two communication channels, a first communication channel C1 with the first wireless communication device 16 and a second communication channel C1′ with the second wireless communication device 16′, based on the presence and possibly the demand of each of the wireless communication devices 16, 16′ (they may have communication requirements that differ from one another).

According to a first variant, the second wireless communication device 16′ sends a pilot signal SP′ which is received by the access point 12 and transmitted to the control unit 22. The control unit 22 takes into account the two pilot signals SP, SP′ originating from each wireless communication device 16, 16′ in order to determine a new parameter of the wave shaping device 14. This parameter is the result of a compromise between to optimize each of the communications, and influences a value of the first pilot signal SP and the second pilot signal SP′.

According to a second variant, wherein the wireless communication devices 16, 16′ use different communication channels and wherein the shaping device 14 comprises two portions, the first portion adapted to the first communication channel C1 and the second portion adapted to the second communication channel C1′, the control unit 22 then determines two new parameters at each iteration, one for each portion of the associated wave shaping device 14.

According to a third variant, wherein the communication network 10″ comprises two wave shaping devices 14, 14′ that are spatially separate or juxtaposed but connected to the same control unit 22, the control unit 22 determines, from the pilot signals SP, SP′, two new parameters at each iteration, a new parameter for each of the two wave shaping devices 14, 14′.

The parameters for each portion or for each shaping device of the above variants may be calculated in parallel.

If, in an initial state, only the first wireless communication device 16 is within range of the access point 12, the wave shaping device 14 (if equipped with the antenna 24) can perform a search of the environment to attempt to detect the possible presence of another wireless communication device, such as the second wireless communication device 16′. Another manner of continuing the detection of possible wireless communication devices out of range of the access point 12 is to interpose the emission of first detection parameters in the emission of the second optimization parameters to the wireless communication device 16, until the eventual reception of a second pilot signal SP′ by the access point 12.

Other ways of detecting the presence of wireless communication devices near the access point 12 and/or wave shaping device 14 are possible.

Once the access point 12 receives the two pilot signals SP, SP′, the control unit 22 can determine second parameters in order to optimize the two communication channels C1 and C1′ between the access point 12 and each of the two wireless communication devices 16, 16′. For example, if the first wireless communication device 16 downloads a large file, which could require more bandwidth in the first communication channel C1 than the usage required for the second wireless communication device 16′ in the second communication channel C1′, the control unit 22 can facilitate the reception of the first wireless communication device 16 over that of the second wireless communication device 16′ (the information on bandwidth demand being for example contained in each of the pilot signals SP and SP′).

Although the case of two wireless communication devices 16, 16′ was discussed above, it is possible for the communication network 10″ to have more than two wireless communication devices.

Figure 4:
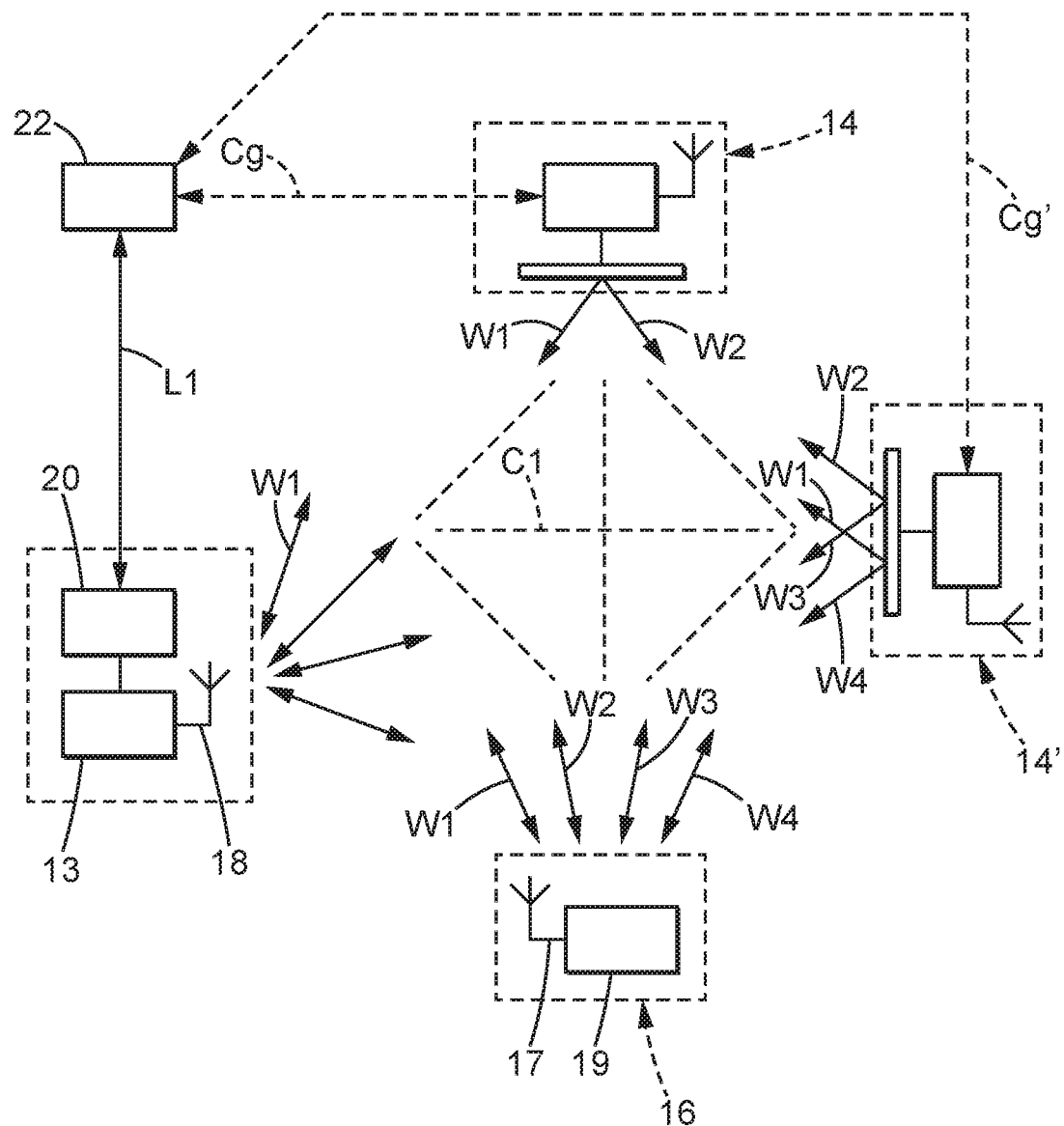
FIG. 4 is a schematic representation of a fourth embodiment of wireless communication network.

Referring now to FIG. 4, a communication network 10‴ according to a fourth embodiment will be described.

The communication network 10‴ of the fourth embodiment is similar to the communication network 10 of the first embodiment, and its variants can also be applied with the same respective advantages. Communication network 10‴ differs essentially in that it comprises a second wave shaping device 14′, similar to the wave shaping device 14 (now called the first shaping device 14). The common elements of the communication networks explained above will not be described again.

The control unit 22 controls the first and second shaping devices 14, 14′ via the management channel Cg (first management channel) between the control unit 22 and the first wave shaping device 14, and a second management channel Cg′ between the control unit 22 and the second wave shaping device 14′. The second management channel Cg′ may be wired or wireless. Each of the first and second shaping devices 14, 14′ optionally has an associated control unit 22 or 22′, these control units 22, 22′ optionally being networked via the global communication network or a local area network.

The second wave shaping device 14′ is similar to the first wave shaping device 14. The second wave shaping device 14′ may optionally have an antenna 24′. The antenna 24′ may be used to receive parameters transmitted by the control unit 22 in the second management channel Cg′. The antenna 24′ may also serve as a means of detecting a wireless communication device 16, for example within range of this antenna 24′ of the second shaping device 14′, and/or not within range of the access point 12, and/or not within range of the first shaping device 14 (if that device is equipped with a similar antenna 24).

The communication network 10‴ of the fourth embodiment functions in the following manner.

The primary wave W1 is reflected by the first wave shaping device 14 in a wave W2. This wave W2 is reflected by the second wave shaping device 14′ in a wave W3. In addition, the primary wave W1 is reflected by the second shaping device 14′ directly in a reflected wave W4. Thus, the field in the environment of the wireless communication device 16 comprises the waves W1, W2, W3, and W4.

The control unit 22 determines the parameters of the first and second wave shaping devices 14, 14′ jointly, in other words they are dependent on one another since the reflection by the second shaping device 14′ includes a reflection of a wave W2 from the first shaping device 14. Any modification of reflected wave W2 will thus cause a modification of reflected wave W3.

When the wave shaping devices 14, 14' are close to one another, the control unit 22 determines the parameters of the first and second wave shaping devices 14' jointly. "Close" is understood to mean that the second wave shaping device 14' is within the range of the first wave shaping device 14.

Similarly to the network antenna 18, the wave shaping device 14 has a range distance (or range) which depends on the technology used (type of wireless link). This range distance is usually defined in an unobstructed area. This range distance is for example the distance starting at which the primary wave transmitted and/or reflected by the wave shaping device 14 has an amplitude reduced to 90% compared to its amplitude at the wave shaping device 14.

In particular, the range distance of the wave shaping device 14 is a function of the number and the surface area of the tunable elements of the adaptable surface 15 of the wave shaping device 14, but also of their arrangements relative to one another (total surface area encompassing all these elements, etc.).

However, the wave shaping device 14 differs from the network antenna 18 in that it is passive (without adding electromagnetic energy to the environment), unlike the network antenna 18 which is active because it emits electromagnetic waves and it is possible to increase its range by amplification of its emission and/or its reception. It should be noted that the operation of the wave shaping device 14 may, for example, limit this amplification and thus reduce the level of electromagnetic energy emitted by the network antenna 18, at constant efficiency—coverage or overall effective range—with the help of the wave shaping device.

The first and second wave shaping devices 14, 14' may also not be close to one another.

If the second wave shaping device 14' is out of range of the access point 12, but both are within range of the wireless communication device 16, the field around the wireless communication device 16 comprises waves W2 and W3. Thus, depending on the arrangement and distance between the wave shaping devices 14, 14' with respect to the wireless communication device 16, communication network 10''' can operate in such a way as to add the contribution of each wave shaping device 14, 14'.

If the second wave shaping device 14' is out of range of the access point 12, and only the second shaping device 14 is within range of the wireless communication device 16, they operate from one to the next: the second wave shaping device 14' receives only reflected wave W2 and the wireless communication device 16 receives only wave W3 reflected on the second wave shaping device 14'.

The control unit 22 may also determine the parameters of the first and second wave shaping devices 14, 14' independently of one another. This may be the case if the second wave shaping device 14' is so far away from the first wave shaping device 14 that it does not receive wave W2. Although the second wave shaping device 14' may possibly still receive the primary wave W1 from the access point 12. This could be the case, for example, if each of the wave shaping devices 14, 14' is in a different room and the access point 12 is between these two rooms.

In general, the second wave shaping device 14' is placed at the limit of the range of the first wave shaping device 14. Being at the limit of the range of the wave shaping device makes it possible to use the wave shaping devices, from one to the next, to reach an area that would not be covered by the access point 12 by itself or even with the assistance of the first shaping device 14. This could be the case in large spaces or in spaces that have zones of communication shadow (examples: an L-shaped corridor or areas between buildings).

Although the case of two wave shaping devices 14, 14' was discussed above, communication network 10''' may comprise more than two wireless communication devices. Similarly, some or all of the communication networks 10', 10'', and 10''' may be combined together. For example, a communication network may contain two or more access points 12, and/or two or more wireless communication devices 16, and/or two or more wave shaping devices 14, as discussed above. The operating mode of such networks is then a combination of the operating modes described above.

According to one aspect, the communication network access point 12 comprises a transmission module 13d comprising a network antenna 18 for emitting and/or receiving a primary wave, and for emitting and receiving a pilot signal from a wireless communication device, and the access point further comprises a control unit 22 which is adapted to send parameters to a wave shaping device, and which determines the parameters on the basis of information related to the pilot signal, the wave shaping device being adapted to reflect and/or transmit the primary wave in a reflected wave as a function of the parameters received from the control unit, the pilot signal being a function of the primary wave emitted by the access point and of the wave reflected by the wave shaping device, and in that:

when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of the temporal succession of the previously received pilot signals and the previously determined parameters.

According to one aspect, the communication network comprises:

an access point 12 comprising a transmission module 13 comprising a network antenna 18 for emitting and/or receiving a primary wave, and for emitting and receiving a pilot signal from a wireless communication device, a control unit 22 in communication with the access point via a feedback transmission module 20 of the access point which transmits to it at least one item of information related to the pilot signal, the control unit determining parameters on the basis of said information; and a wave shaping device 14 in communication with the control unit 22, the wave shaping device being adapted to reflect and/or transmit the primary wave in a reflected wave as a function of the parameters received from the control unit, and the pilot signal being a function of the primary wave emitted by the access point and of the wave reflected by the wave shaping device, and wherein:

when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of the temporal succession of the previously received pilot signals and the previously determined parameters.

According to one aspect, the wireless communication method implemented in a communication network comprises:

an access point 12 comprising a transmission module 13 comprising a network antenna 18 for emitting and/or receiving a primary wave, a control unit 22 in communication with the access point via a feedback transmission module 20 of the access point, and a wave shaping device 14 in communication with the control unit 22, said method being characterized in that:

the wireless communication device emits a pilot signal in response to a received primary wave, the access point transmits to the control unit 22, and via the feedback transmission module 20, at least one item of information related to the pilot signal, the control unit determines parameters on the basis of said information, and transmits the parameters to the wave shaping device, the wave shaping device 14 reflects and/or transmits the primary wave in a reflected wave as a function of the parameters received from the control unit, the pilot signal being a function of the primary wave emitted by the access point and of the wave reflected by the wave shaping device, and when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of the temporal succession of the previously received pilot signals and the previously determined parameters.

The invention claimed is:

1. A communication network access point, comprising:
 a transmission module comprising a network antenna for emitting and/or receiving a primary wave, and for receiving a pilot signal from a wireless communication device; and
 a control unit which is adapted to send parameters to a wave shaping device, and which determines the parameters on the basis of at least one item of information contained in the pilot signal, the wave shaping device being adapted to reflect and/or transmit the primary wave in a reflected wave as a function of the parameters received from the control unit, the information being a function of the primary wave emitted by the access point and of the wave reflected by the wave shaping device,
 wherein:
  when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters, and
  as long as the transmission module does not receive a pilot signal from a wireless communication device, the control unit is in a search operating mode wherein the control unit transmits parameters to the wave shaping device, the transmission of each of the parameters being separated in time by a duration enabling reception of a pilot signal by the transmission module.

2. The access point according to claim 1, wherein the network antenna is multiple antennas.

3. The access point according to claim 2, wherein the access point adjusts, via the network antenna, the emission towards the wireless communication device before allowing the control unit to enter the optimization operating mode which optimizes parameters of the wave shaping device.

4. The access point according to claim 2,
 wherein the wave shaping device comprises an antenna, and
 wherein the access point adjusts the emission of the network antenna towards said antenna of the wave shaping device before allowing the control unit to enter the optimization operating mode which optimizes parameters of the wave shaping device.

5. The access point according to claim 1, wherein the access point adjusts, via the network antenna, the emission towards the wireless communication device or towards the wave shaping device after completion of the optimization of the wave shaping device by the control unit.

6. A communication network, comprising:
 an access point comprising a transmission module comprising a network antenna for emitting and/or receiving a primary wave, and for receiving a pilot signal from a wireless communication device;
 a control unit in communication with the access point via a feedback transmission module of the access point which transmits to the access point at least one item of information contained in the pilot signal, the control unit determining parameters on the basis of said information; and
 a wave shaping device in communication with the control unit, the wave shaping device being adapted to reflect and/or transmit the primary wave in a reflected wave as a function of the parameters received from the control unit, and the information being a function of the primary wave emitted by the access point and of the wave reflected by the wave shaping device,
 wherein:
 when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters, and
 as long as the transmission module does not receive a pilot signal from the wireless communication device, the control unit is in a search operating mode wherein the control unit transmits parameters to the wave shaping device, the transmission of each of the parameters being separated in time by a duration enabling reception of a pilot signal by the transmission module.

7. The communication network according to claim 6, wherein the network antenna is multiple antennas.

8. The communication network according to claim 7, wherein the access point adjusts, via the network antenna, the emission towards the wireless communication device before allowing the control unit to enter the optimization operating mode which optimizes parameters of the wave shaping device.

9. The communication network according to claim 7,
wherein the wave shaping device comprises an antenna, and
wherein the access point adjusts the emission of the network antenna towards said antenna of the wave shaping device before allowing the control unit to enter the optimization operating mode which optimizes parameters of the wave shaping device.

10. The communication network according to claim 6, wherein the access point adjusts, via the network antenna, the emission towards the wireless communication device or towards the wave shaping device after completion of the optimization of the wave shaping device by the control unit.

11. The communication network according to claim 6,
wherein the wave shaping device comprises an antenna, and the wave shaping device uses said antenna to detect the presence of a wireless communication device not detected by the access point, by receiving a pilot signal, and
wherein the wave shaping device transmits this detection to the access point in order to allow the control unit to enter the optimization operating mode which optimizes parameters of the wave shaping device.

12. The communication network according to claim 6, wherein the control unit includes a database, and the parameters of the optimization operating mode come at least partially from said database.

13. The communication network according to claim 6, wherein the pilot signal received by the feedback transmission module of the access point comprises geolocation coordinate information for the wireless communication device, and the control unit determines the parameters of the optimization operating mode on the basis of said geolocation coordinate of the wireless communication device.

14. The communication network according to claim 6, wherein the parameters of the search operating mode are determined randomly.

15. The communication network according to claim 6, wherein the distance between the access point and the wave shaping device is at least one tenth of the range of the access point.

16. The communication network according to claim 6, wherein the control unit transmits the parameters to the wave shaping device via a wireless link in a management channel.

17. The communication network according to claim 6,
wherein the access point is a first access point emitting a first primary wave, and
wherein the communication network further comprises a second access point, the second access point emitting a second primary wave, and the wave shaping device being adapted to reflect and/or reflect the first primary wave as a first reflected wave and the second primary wave as a second reflected wave.

18. The communication network according to claim 6,
wherein the wave shaping device is a first wave shaping device, and
wherein the communication network further comprises a second wave shaping device, the control unit transmitting parameters to the second wave shaping device independently of the parameters determined for the first wave shaping device.

19. The communication network according to claim 6,
wherein the wireless communication device is a first wireless communication device, and the pilot signal is a first pilot signal emitted by the first wireless communication device,
wherein the communication network further comprises a second wireless communication device which emits a second pilot signal, and
wherein the access point transmits at least some information from the first pilot signal and second pilot signal to the control unit so that the control unit can determine the parameters on the basis of the first pilot signal and second pilot signal.

20. The communication network according to claim 6, wherein the wave shaping device comprises two portions, each of the two portions being adapted to modify a primary wave in a different bandwidth than that of the other portion and each of the two portions being configurable independently of one another.

21. The communication network according to claim 6, wherein the primary wave corresponds to a wave of a communication channel of a network of a type selected from a list comprising a wireless telephony network, a wireless computer network, and a network of connected objects.

22. A method of wireless communication implemented in a communication network comprised of an access point comprising a transmission module comprising a network antenna for emitting and/or receiving a primary wave, a control unit in communication with the access point via a feedback transmission module of the access point, and a wave shaping device in communication with the control unit, said method comprising:
the wireless communication device emits a pilot signal in response to a received primary wave;
the access point transmits, to the control unit and via the feedback transmission module, at least one item of information contained in the pilot signal;
the control unit determines parameters on the basis of said information, and transmits the parameters to the wave shaping device;
the wave shaping device reflects and/or transmits the primary wave in a reflected wave as a function of the parameters received from the control unit, the information being a function of the primary wave emitted by the access point and of the wave reflected by the wave shaping device;
when the transmission module receives a pilot signal from a wireless communication device, the control unit is in an optimization operating mode wherein the control unit transmits parameters to the wave shaping device, the transmission of each of the parameters being separated in time by a duration enabling reception of a pilot signal by the transmission module, and wherein the control unit determines new parameters by an optimization algorithm which optimizes a value that is a function of a temporal succession of the previously received pilot signals and the previously determined parameters; and
as long as the transmission module does not receive a pilot signal from a wireless communication device, the control unit is in a search operating mode wherein the control unit transmits parameters to the wave shaping device, the transmission of each of the parameters being separated in time by a duration enabling reception of a pilot signal by the transmission module.

* * * * *